(12) United States Patent
Bykampadi et al.

(10) Patent No.: US 11,792,163 B2
(45) Date of Patent: Oct. 17, 2023

(54) SECURITY MANAGEMENT FOR NETWORK FUNCTION MESSAGING IN A COMMUNICATION SYSTEM

(71) Applicant: Nokia Technologies Oy, Espoo (FI)

(72) Inventors: Nagendra S. Bykampadi, Bangalore (IN); Uwe Rauschenbach, Munich (DE)

(73) Assignee: Nokia Technologies Oy, Espoo (FI)

( * ) Notice: Subject to any disclaimer, the term of this patent is extended or adjusted under 35 U.S.C. 154(b) by 418 days.

(21) Appl. No.: 17/053,127

(22) PCT Filed: May 10, 2019

(86) PCT No.: PCT/FI2019/050369
§ 371 (c)(1),
(2) Date: Nov. 5, 2020

(87) PCT Pub. No.: WO2019/220010
PCT Pub. Date: Nov. 21, 2019

(65) Prior Publication Data
US 2021/0243165 A1 Aug. 5, 2021

(30) Foreign Application Priority Data
May 12, 2018 (IN) .............................. 201841017927

(51) Int. Cl.
*H04L 9/40* (2022.01)
*H04L 61/45* (2022.01)

(52) U.S. Cl.
CPC .......... *H04L 63/0281* (2013.01); *H04L 61/45* (2022.05); *H04L 63/0428* (2013.01); *H04L 63/12* (2013.01); *H04L 63/20* (2013.01)

(58) Field of Classification Search
CPC . H04L 63/0281; H04L 63/0428; H04L 63/12; H04L 63/20
(Continued)

(56) References Cited

U.S. PATENT DOCUMENTS 8,352,570 B2 * 1/2013 Saxena ................. H04L 67/568
709/216
8,560,843 B1 * 10/2013 Moscaritolo ............ H04L 67/02
713/162
(Continued)

FOREIGN PATENT DOCUMENTS

| WO | 2017/004373 A1 | 1/2017 |
| WO | 2019/193252 A1 | 10/2019 |
| WO | 2019/211517 A1 | 11/2019 |

OTHER PUBLICATIONS

"Integrity Protection for SBA over N32", 3GPP TSG SA WG3 (Security) Meeting #90bis, S3-180898, Agenda: 4.1.13.2, NTT Docomo, Feb. 26-Mar. 2, 2018, 4 pages.
(Continued)

*Primary Examiner* — Dant B Shaifer Harriman
(74) *Attorney, Agent, or Firm* — Duft & Bornsen, PC

(57) ABSTRACT

In a communication system wherein a first security edge protection proxy (SEPP) element of a first network is operatively coupled to a second SEPP element of a second network, a method includes receiving, at the first SEPP element, a first message from a first network function in the first network addressed to a second network function in the second network, the first message comprising one of a request and a response line comprising a uniform resource identifier (URI) having a plurality of elements. The method also includes forming, at the first SEPP, a second message comprising encrypted and integrity protected portions, the encrypted portion comprising an encryption of at least a subset of the plurality of elements of the URI, the integrity protected portion comprising a structured representation of the URI wherein instances of elements in the subset are replaced with references to the encrypted portion.

19 Claims, 9 Drawing Sheets

(58) Field of Classification Search
USPC .......................................................... 726/12
See application file for complete search history.

(56) References Cited

U.S. PATENT DOCUMENTS

| | | | | |
|---|---|---|---|---|
| 9,461,817 | B2* | 10/2016 | Moore | H04L 9/08 |
| 10,880,785 | B2* | 12/2020 | Wang | H04L 65/40 |
| 10,931,648 | B2* | 2/2021 | Neal | H04L 9/0822 |
| 11,102,058 | B1* | 8/2021 | Hua | H04L 41/0668 |
| 2006/0106802 | A1* | 5/2006 | Giblin | H04L 63/10 |
| | | | | 707/E17.112 |
| 2006/0123226 | A1* | 6/2006 | Kumar | H04L 63/0281 |
| | | | | 713/154 |
| 2014/0280883 | A1* | 9/2014 | Pieczul | H04L 67/563 |
| | | | | 709/224 |
| 2015/0264020 | A1* | 9/2015 | Ackerly | H04L 63/0428 |
| | | | | 713/168 |
| 2017/0141926 | A1 | 5/2017 | Xu et al. | |
| 2017/0169123 | A1* | 6/2017 | Reshadi | H04L 9/3236 |
| 2018/0041604 | A1* | 2/2018 | Poblete | H04L 67/561 |
| 2020/0296606 | A1* | 9/2020 | Mendoza | H04L 41/12 |
| 2022/0166790 | A1* | 5/2022 | Koral | H04L 43/16 |

OTHER PUBLICATIONS

Berners Lee et al., "Uniform Resource Identifier (URI): Generic Syntax", RFC 3986, Network Working Group, Jan. 2005, pp. 1-61.

"3rd Generation Partnership Project; Technical Specification Group Services and System Aspects; Security architecture and procedures for 5G system (Release 15)", 3GPP TS 33.501, V15.0.0, Mar. 2018, pp. 1-128.

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.

"3rd Generation Partnership Project; Technical Specification Group Services and System Aspects; Security architecture and procedures for 5G system (Release 15)", 3GPP TS 33.501, V0.7.0, Jan. 2018, pp. 1-109.

Jones et al., "JSON Web Encryption (JWE)", RFC 7516, Internet Engineering Task Force (IETF), May 2015, pp. 1-51.

Miller, "Examples of Protecting Content Using JSON Object Signing and Encryption (JOSE)", RFC 7520, Internet Engineering Task Force (IETF), May 2015, pp. 1-120.

Hoffman et al., "JSON Merge Patch", RFC 7386, Internet Engineering Task Force (IETF), Oct. 2014, pp. 1-9.

Bryan et al., "JavaScript Object Notation (JSON) Patch", RFC 6902, Internet Engineering Task Force (IETF), Apr. 2013, pp. 1-18.

International Search Report and Written Opinion received for corresponding Patent Cooperation Treaty Application No. PCT/FI2019/050369, dated Jul. 3, 2019, 14 pages.

"SBA: A Framework for HTTP Message Protection Scheme in Sepp", 3GPP TSG SA WG3 (Security) Meeting #91, S3-181427, Agenda : 7.2.13.1, Nokia, Apr. 16-20, 2018, 6 pages.

Office action received for corresponding Indian Patent Application No. 201841017927, dated Nov. 15, 2022, 6 pages.

Extended European Search Report received for corresponding European Patent Application No. 19802854.0, dated Dec. 13, 2021, 8 pages.

"Living Document: Security of Service Based Architecture of 5G phase 1", 3GPP TSG SA WG3 (Security) Meeting #90bis, S3-180888, Agenda : 4.1.13.5, China Mobile, Feb. 26-Mar. 2, 2018, 18 pages.

\* cited by examiner

```
HTTP Request Line
HTTP Header
HTTP Body
{
    "encBlock" : [
        123,
        Hdr2,
        IE2
    ],
    "iPBlock" : {
        "Request_Line" : {
            "Method" : {},
            "Scheme" : {},
            "Authority" : {},
            "Path" : [
                {},
                ...
                {"value":{"encBlockRef":"0"},
                 "name":"supi"}
            ],
            "Query_opaque" : {},
            "Query_structured" : [
                {},
                {}
            ],
            "Fragment" : {},
            "Protocol version" : {}
        },
        "HTTP_Headers" : {
            "Hdr1" : {},
            "Hdr2" : {"encBlockRef": 1}
        },
        "Payload" : {
            "IE1" : {},
            "IE2" : {"encBlockRef": 2},
            "IE3" : {},
            "IE4" : {}
        }
    },
    mIpBlock = {
        "Mod_chain":[]
    }
}
```

SECURITY MANAGEMENT FOR NETWORK FUNCTION MESSAGING IN A COMMUNICATION SYSTEM

RELATED APPLICATION

This application claims priority to PCT Application No. PCT/FI2019/050369, filed on May 10, 2019, which claims priority to Indian Application No. 201841017927, filed on May 12, 2018, each of which is incorporated herein by reference in its entirety.

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises the following steps. In a communication system comprising a first network operatively coupled to a second network wherein a first security edge protection proxy element of the first network is operatively coupled to a second security edge protection proxy element of the second network, the method comprises the step of receiving, at the first security edge protection proxy element, a first message from a first network function in the first network, the first message being addressed to a second network function in the second network, the first message comprising one of a request line and a response line comprising a uniform resource identifier (URI) having a plurality of elements. The method further comprises the step of forming, at the first security edge protection proxy element, a second message comprising an encrypted portion and an integrity protected portion, the encrypted portion comprising an encryption of at least a subset of the plurality of elements of the URI, the integrity protected portion comprising a structured representation of the URI wherein instances of elements in the subset are replaced with references to the encrypted portion.

The URI may comprise at least one of a path component and a query component, and the structured representation of the URI may comprise an array of structured objects comprising substrings of the path and query components.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 8 illustrates an example of a request message with structured representation of message components according to an illustrative embodiment.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
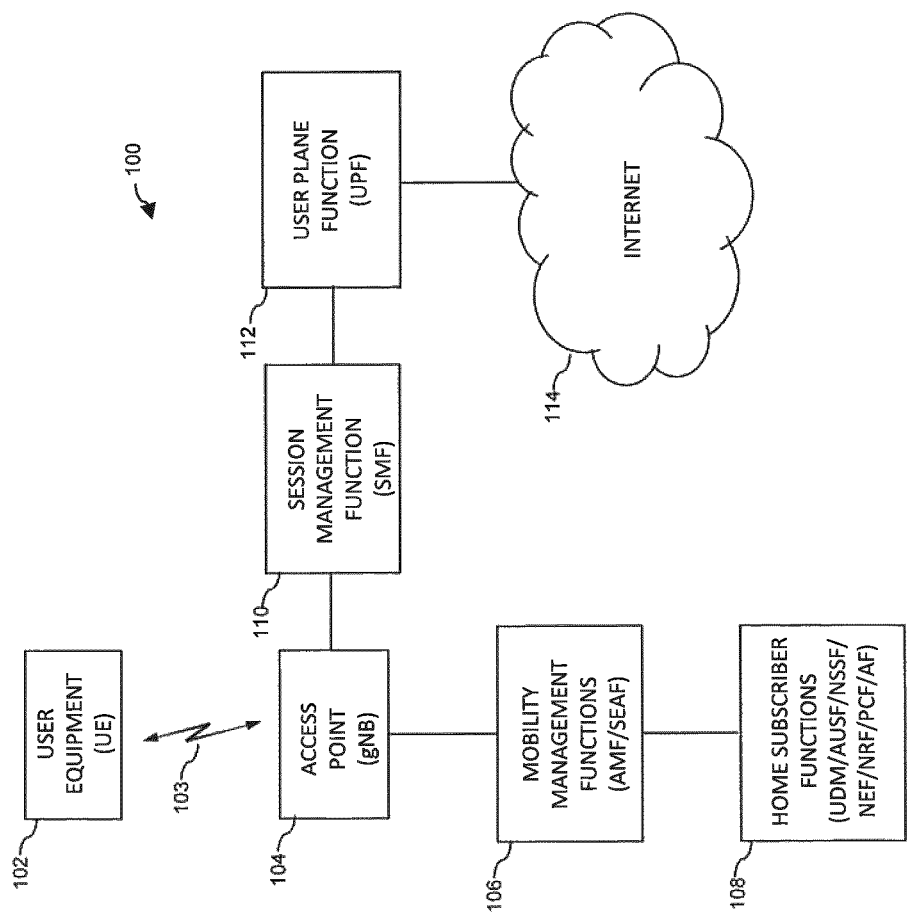
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
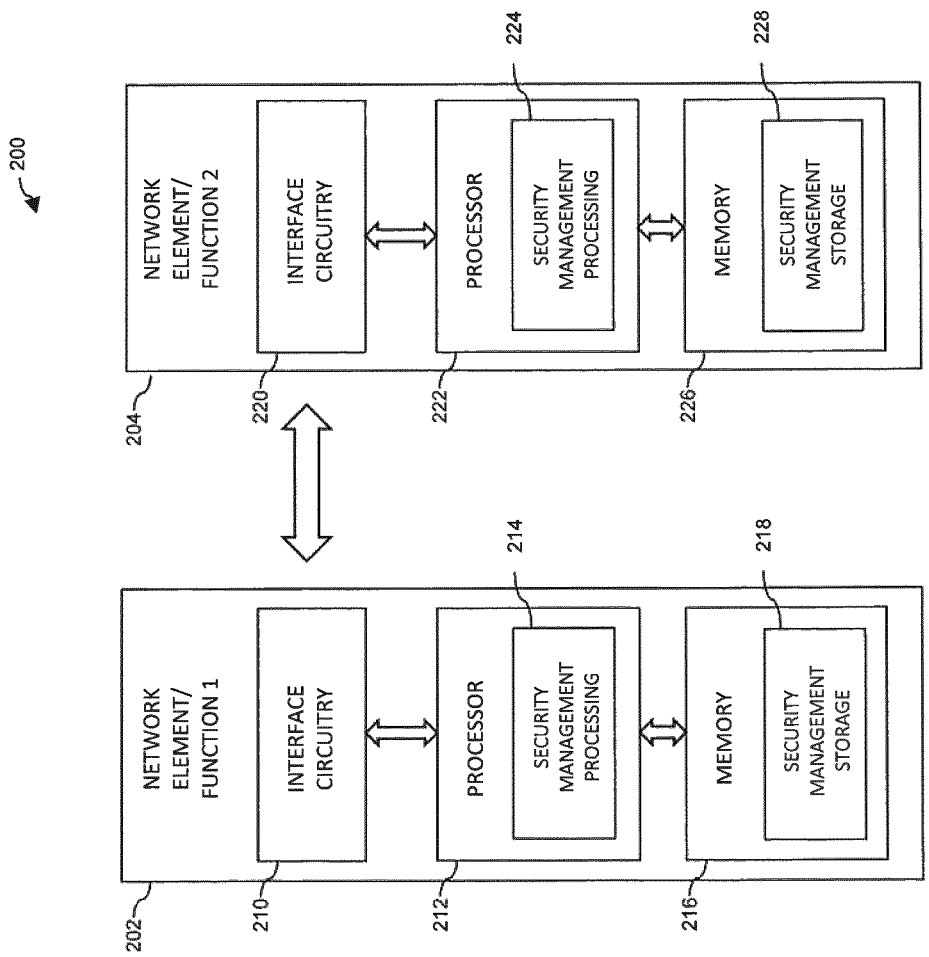
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SERF, UDM, AUSF, NSSF, NEF, NRF, PCF and AF. Further, one or both of the first network element/function 202 and the second network element/function 204 may also represent a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
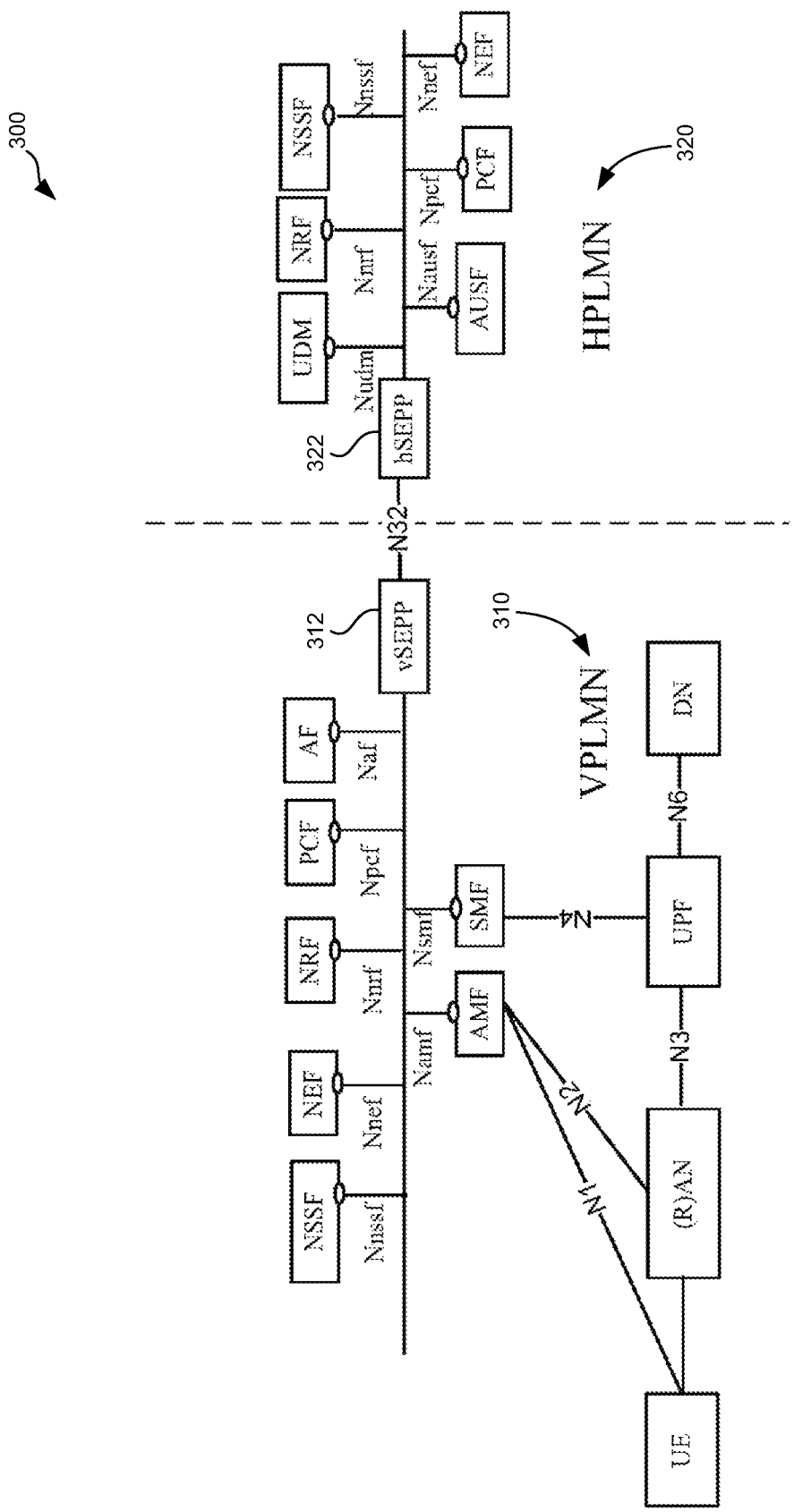
FIG. 3 illustrates a communication system architecture with security edge protection proxies between a visited network and a home network with which one or more illustrative embodiments may be implemented.

FIG. 3 depicts a 5G architecture in a configuration comprising a visited public land mobile network (VPLMN) 310 operatively coupled to a home public land mobile network (HPLMN) 320. More particularly, FIG. 3 illustrates the presence of a Security Edge Protection Proxy (SEPP) at the edge of each PLMN, i.e., vSEPP 312 in VPLMN 310 and hSEPP 322 in HPLMN 320. It is to be appreciated that the various network functions shown in the VPLMN 310 and the HPLMN 320 are known and described in detail in various 5G specifications such as, but not limited to, the above-referenced TS 23.501 and TS 33.501.

As mentioned above, in 5G, SBA is introduced to model services as network functions (NFs) that communicate with each other using Restful application programming interfaces (Representational State Transfer APIs). In the scenario where the two communicating NFs are in two different PLMNs (e.g., VPLMN 310 and HPLMN 320), communication happens over a roaming inter-network interface (N32) between the two participating PLMNs.

To protect NF specific content in the messages that are sent over the roaming inter-network interface, 5G introduces the SEPP as the entity residing at the perimeter of the PLMN network to protect the PLMN from outside traffic and additionally implements transport layer security and application layer security for all the data and signalling exchanged between two inter-network network functions at the service layer. For example, the SEPP performs security management functions on information elements (IEs) in HyperText Transport Protocol (HTTP) messages before the messages are sent externally over the roaming N32 interface.

Application layer security involves protecting information sent in various parts of the HTTP message including, but not limited to, HTTP Request/Response Line, HTTP header and HTTP Payload. However, some parts of this message may need to be modified by intermediaries (Inter-network Packet eXchange (IPX) providers not expressly shown in FIG. 3) between the two SEPPs.

Thus, in 5G SBA, the PLMN operator deploys a SEPP at the edge of its network to interoperate and obtain services from network functions in its roaming partner networks. The SEPP interfaces with one or more other SEPPs in one or more other networks over the N32 interface. As an edge proxy, the SEPP implements application layer security to protect HTTP messages exchanged between a network function in its network and another network function in the roaming partner network.

Figure 4:
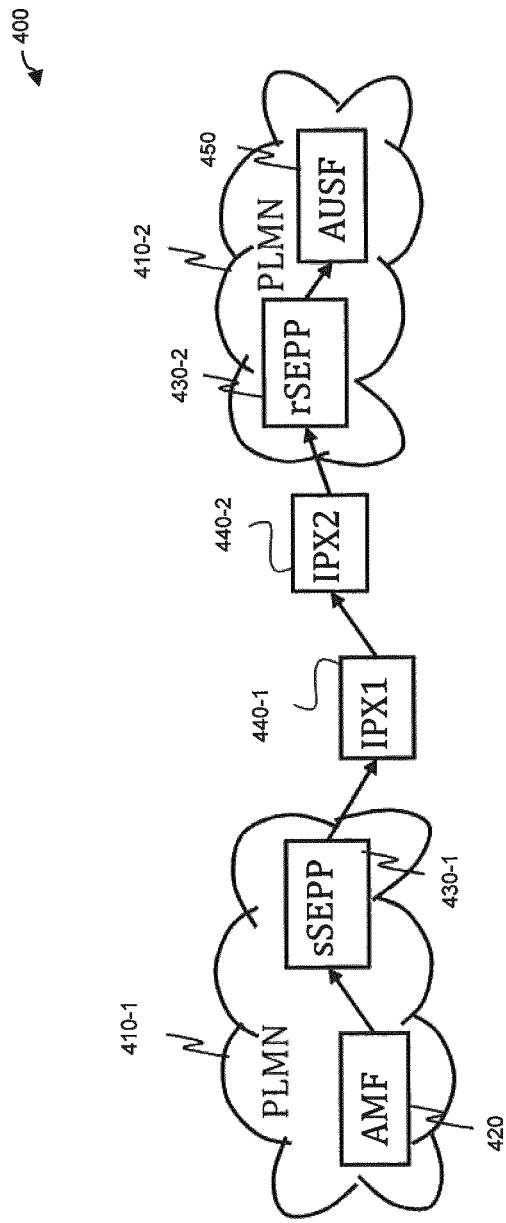
FIG. 4 illustrates a portion of a communication system with network functions communicating through security edge protection proxies between a first network and a second network with which one or more illustrative embodiments may be implemented.

Proposals for security management in network function messaging utilizing SEPPs have been made. For example, mechanisms have been proposed for SEPPs to apply protection to HTTP requests and responses exchanged between two NFs in different PLMNs. FIG. 4 shows an architectural drawing of a system 400 in an example embodiment. The system 400 of FIG. 4 includes two PLMNs 410-1 and 410-2. The PLMN 410-1 is equipped with a first NF 420 that in a sending case is, for example, an AMF. The PLMN 410-1 further comprises a SEPP 430-1. In the FIG. 4 example, the SEPP 430-1 of PLMN 410-1 acts as a sending SEPP or sSEPP for a given message. The PLMN 410-2 includes another SEPP 430-2 that acts as a receiving SEPP or rSEPP for the given message. The SEPPs 430-1 and 430-2 (collectively, SEPPs 430) are network nodes at the boundary of an operator's network that receive messages such as HTTP request or HTTP response messages from respective NFs in the PLMNs 410-1 and 410-2 (collectively, PLMNs 410). More particularly in the FIG. 4 example, the sSEPP 430-1 receives a message (e.g., an HTTP request or HTTP response) from the network function AMF 420, applies protection for sending, and forwards a reformatted message through a chain of intermediate nodes such as IP eXchanges (IPX) 440-1 and 440-2 (collectively, intermediate nodes 440) towards the rSEPP 430-2.

The rSEPP 430-2 receives a potentially modified protocol message from one of the intermediate nodes 440, re-assembles the message (e.g., an HTTP request or HTTP response), and forwards the re-assembled message towards a second NF within its operator's network, such as the AUSF 450 in the FIG. 4 example. The re-assembled message can alternatively be sent towards any other NF in the PLMN 410-2.

The intermediate nodes 440 or intermediaries, in short, are network nodes outside the operator's network that receive (directly or indirectly via other intermediaries) a reformatted message from the sSEPP 430-1, that may selectively modify the message according to a method for integrity protection with modification tracking, and that forward the modified message towards another intermediary 440 or to the rSEPP 430-2.

The sSEPP 430-1 and rSEPP 430-2 may simultaneously act in both the "sender" and "receiver" roles, and their structure may also be similar or identical. The roles of the SEPPs 430 in delivery of a particular message are identified by the use of the prefix "s" or "r" indicating whether they send or receive a particular message.

Assuming that a message to be transmitted is an HTTP message that complies to HTTP protocol, the message includes three protocol elements:

A) A request line or a response line. The request line consists, for example, of 1) an HTTP method, 2) a request Uniform Resource Identifier (URI) that may contain an authority (host and port), a hierarchical part, a query and a fragment part, and 3) a protocol identifier. The response line consists, for example, of a protocol identifier, a status code and a status text;

B) A set of HTTP headers; and

C) An optional payload body, for instance formatted as JavaScript Object Notation (JSON) or Extensible Markup Language (XML).

All three parts may contain parameters of a higher-layer protocol that is carried over HTTP, which may be of interest to the intermediaries for reading and/or modifying the parameters.

For each part, one of three protection methods defined below can be applied to them (or to desired one or more sub-parts such as given attributes or nested attributes).

Methods of protection of different parts can be freely chosen. The following standardized methods of protection are provided as examples:

A) Encryption: The part(s) of the intermediate data structure that require(s) end-to-end (e2e) confidentiality protection is/are encrypted (e.g. using JSON Web Encryption (JWE) of RFC 7516);

B) E2E Integrity Protection: The part(s) of the intermediate data structure that require(s) e2e protection from modification by the intermediaries is/are signed (e.g., using JSON Web Signature (JWS) of RFC 7520); and C) Integrity Protection with Modification Tracking: The part(s) of the intermediate data structure that are allowed to be modified (selectively) by the intermediaries is/are protected as described below.

The integrity protection with modification tracking is configured to store the original data structure together with a signature of the sSEPP 430-1, and to additionally store the modification chain, one entry per intermediary, and sign each modification chain entry with the signature of the intermediary that has performed the modification. This way, the rSEPP 430-2 can subsequently determine separately for each change whether it was performed by an authorized intermediary 440 and whether it complies with the policy for that intermediary.

In some embodiments, the original data structure is dynamic such that each intermediate node 440 adds a new field to a modified item so as to form a growing array.

Figure 5:
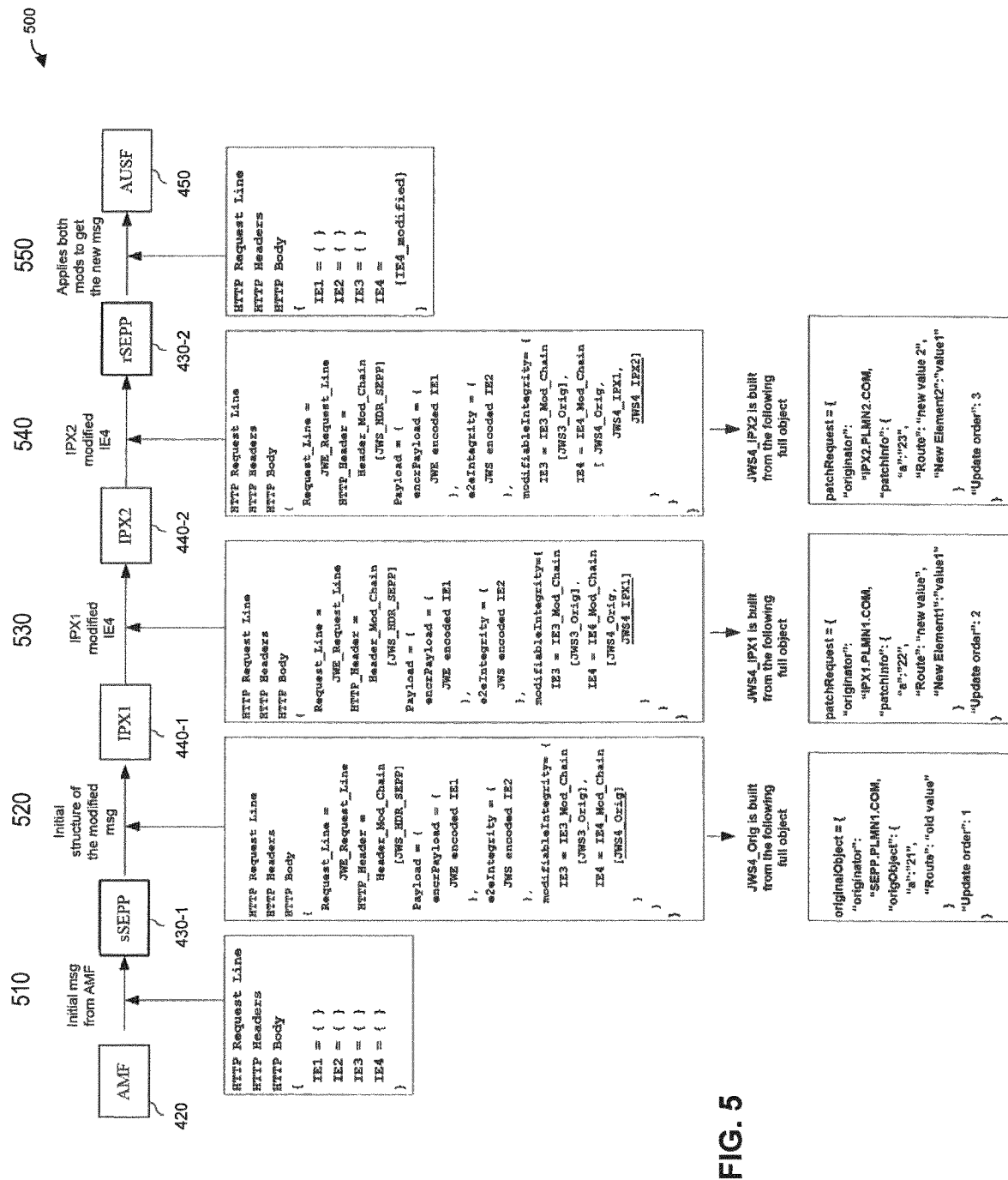
FIG. 5 illustrates one example of a request message flow through the portion of the communication system in FIG. 4.

FIG. 5 shows an example request message flow 500 for a request message that is sent from a NF (e.g., AMF 420) in a first PLMN (e.g., PLMN 410-1) to a NF (e.g., AUSF 450) in a second PLMN (e.g., PLMN 410-2). FIG. 5 more particularly illustrates how an original HTTP request message (also referred to herein as a "first message") is transformed as it traverses in this example from the AMF 420 in PLMN 410-1 via sSEPP 430-1 at the edge and over an N32 interface through two IPX providers 440-1 and 440-2 which modify a given IE (i.e., IE4) in the message. The transformed message sent by the sSEPP 430-1 is also referred to herein as a "second message." The rSEPP 430-2 verifies the received second message (as modified by the IPX providers 440-1 and 440-2), and re-assembles the original HTTP request message with the modified IE4. The re-assembled message generated by rSEPP 430-2 is also referred to herein as a "third message." It should be appreciated that the third message may be the same as or different (by content) than the second message, depending on whether all modifications by the IPX providers 440-1 and 440-2 were found acceptable by the rSEPP 430-2. The third message is forwarded from the rSEPP 430-2 to the AUSF 450.

In block 510, the sSEPP 430-1 receives the first or initial message from the AMF 420. It is assumed, in this example, that: IE1 needs confidentiality protection; IE2 needs e2e integrity protection; IE3 needs integrity protection with modification tracking; and IE4 needs integrity protection with modification tracking.

In block 520, the sSEPP 430-1 generates a modified message (e.g., the second message). In the modified message, attributes or information elements IE3 and IE4 are integrity protected but may also be modified by intermediaries 440. Hence, sSEPP 430-1 generates arrays (denoted IE3_Mod_Chain and IE4_Mod_Chain) to store possible updates by the intermediaries 440. Each JWS object created by the sSEPP 430-1 contains a protected header, a protected payload and a signature. In this context, the header and payload naturally refer to parts of the JWS object. The header includes the algorithm used in generating the signature, the payload includes the original JSON object, and the signature is of the header and payload.

In block 530, the IPX1 (e.g., intermediary 440-1) modifies IE4 in the second message received from the sSEPP 430-1. IPX1 creates a patch request, protects it with JWS, and inserts it into 1E4_Mod_Chain. In the FIG. 5 example, the use of the "JSON Merge Patch" format of RFC 7386 is used to capture the forward delta. It should be appreciated, however, that in other embodiments the "JSON Patch" format of RFC 6902 may be used, or other means such as a UNIX diff format may be used for capturing the forward delta. It should be further appreciated that in still other embodiments a full JSON object may be created rather than just a forward delta, where the full JSON object is constructed by applying any modifications in the modification chain in sequence to the original JSON object. In the FIG. 5 example, values of "a" and "Route" are modified to 22 and value1 respectively by IPX1. In addition, a new element is added called "New Element 1". The patchRequest is used as payload by the intermediary 440 when creating the JWS object for addition to the IE4_Mod_Chain.

In block 540, IPX2 (e.g., intermediary 440-2) modifies IE4. IPX2 updates IE4 including addition of a new element called "New Element 2", integrity protects it with JWS and adds to IE4_Mod_Chain.

In block 550, the rSEPP 430-2 re-assembles the message and sends it to the AUSF 450. Once the rSEPP 430-2 individually verifies the updates and their validity, the rSEPP 430-2 re-assembles the HTTP Request (or HTTP Response) from the Request_Line (or Response_Line) information, the HTTP_Header information, the consolidated JSON object, and the remaining e2e protected or encrypted parts of the payload.

Figure 6:
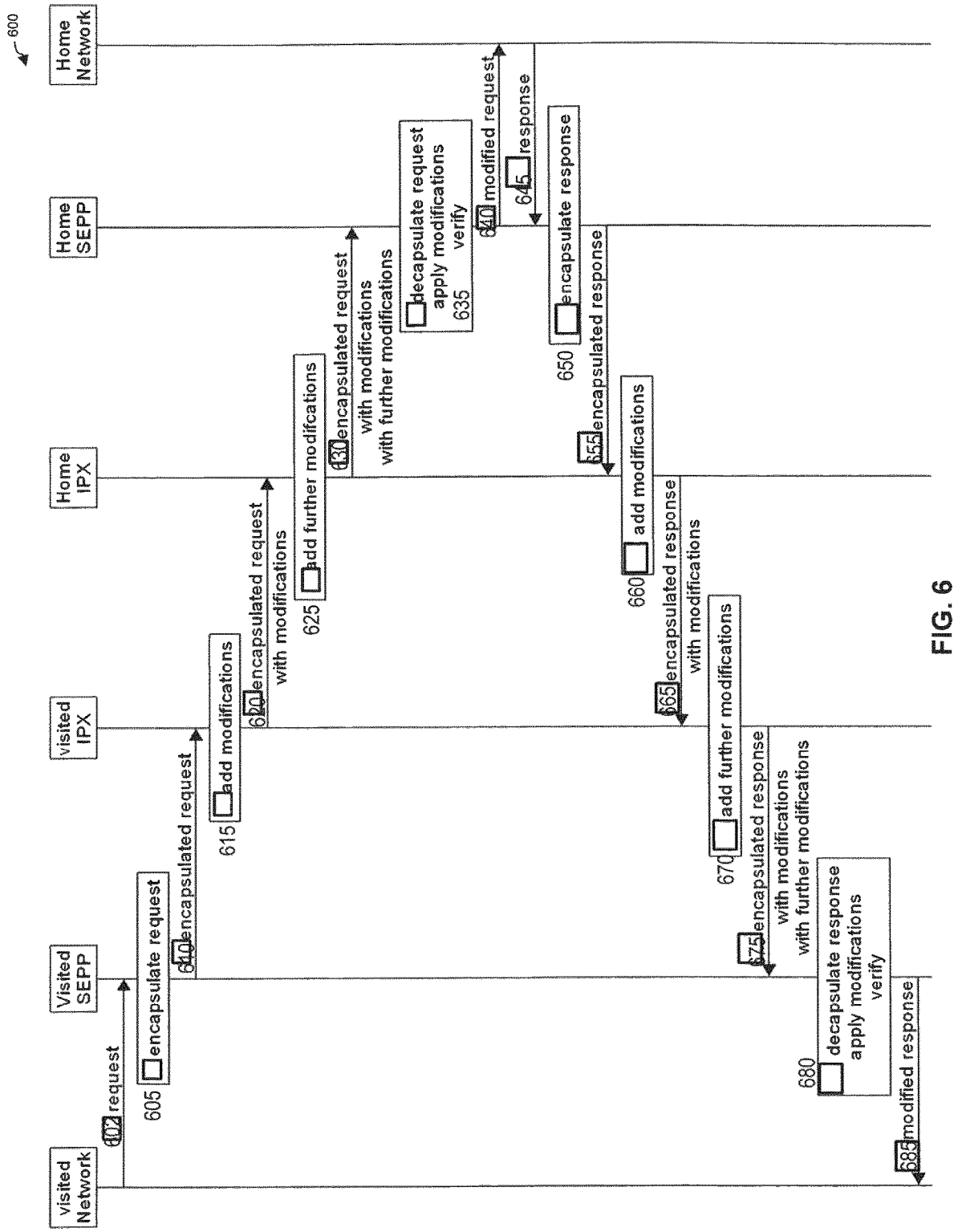
FIG. 6 illustrates another example of a request message flow through the portion of the communication system in FIG. 4.

FIG. 6 shows an example message flow 600 across N32 based on integrity protection with modification tracking based on forward delta. In steps 602 to 640, the visited SEPP (vSEPP) acts as the sending SEPP (e.g., sSEPP 430-1) and the home SEPP (hSEPP) acts as the receiving SEPP (e.g., sSEPP 430-2). In steps 645 to 685, the roles are reversed.

In step 602, the vSEPP receives an HTTP request or first message from the visited network (e.g., from a NF in the visited network such as AMF 420). The vSEPP in step 605 encapsulates the HTTP request line into a JSON object called Request_Line containing an element each for the method, the URI and the protocol of the request. The vSEPP encapsulates the header of the request into a JSON array called HTTP_Header, with each value in the array being a JWS object for the header in the original request. The payload for the JWS object includes all headers in the original request.

For those JSON objects that require e2e confidentiality protection between the vSEPP and the hSEPP, the vSEPP executes JWE to encrypt the object. The JWE object replaces the original object in the second message.

For those JSON objects that require e2e integrity protection, the vSEPP executes the JWS to integrity protect the object. The JWS object replaces the original object in the second message.

For those JSON objects that require integrity protection but may also be modifiable by intermediaries (e.g., visited IPX and home IPX, such as IPX1 440-1 and IPX 440-2), the vSEPP creates in the second message an array for each of those JSON objects. For each of those identified objects, the vSEPP integrity protects the original object using JWS, and inserts the resulting JWS object as the first element of the corresponding array.

In step 610, the vSEPP utilizes HTTP POST to send the protected request or second message towards a first intermediary (e.g., the visited network's IPX provider). In step 615, the visited IPX provider determines which IEs require updates. For each identified IE, the visited IPX provider: (i) creates a Patch Request JSON object that includes all its desired changes for the IE, where the syntax and semantics for the Patch Request JSON object may be taken from RFC 7386 "JSON Merge Patch."; (ii) includes its identity in the Patch Request along with the next available slot in the patch array that it will use to insert the Patch Request; and (iii) executes JWS on the Patch Request JSON object and inserts it into the next available slot in the corresponding array.

In step 620, the visited IPX provider sends the encapsulated request (e.g., the once modified second message) to a second intermediary (e.g., the home network's IPX provider) similar to step 610. In step 625, the home IPX provider repeats the processing described above with respect to step 615 for any further modifications. In step 630, the home IPX provider sends the encapsulated request (e.g., the twice modified second message) to the hSEPP similar to step 610. It should be appreciated that the behaviour of the intermediaries is not normative, but the hSEPP may assume normative behavior for processing the resulting request.

In step 635, the hSEPP receives the second message with all updates by the intermediate nodes stored in corresponding arrays but not applied yet to the original value. The hSEPP verifies integrity and authenticity of each update individually, and checks whether the modifications performed by the intermediate nodes were permitted by policy. The hSEPP then applies the patches in order and creates an HTTP Request (e.g., the third message). In step 640, the hSEPP sends the HTTP Request resulting from the processing in step 635 to a NF in the home network (e.g., AUSF 450).

Steps 645 to 685 are analogous to steps 602 to 640, but treat the HTTP Response like the HTTP Request.

In some embodiments, data re-arrangement may be provided when generating the second message from the first message. For each part of the message (e.g., the request or response line, the set of HTTP headers, and the payload), the data are re-arranged (for instance by defining a suitable intermediate JSON structure or JSON structures) such that one of the three protection methods described above can be applied to them (or to desired one or more sub-parts such as given attributes or nested attributes). In the data re-arrangement context, the three protection methods may be associated with different parts or blocks in the second message as indicated below:

A) Encryption (encBlock): The part(s) of the intermediate data structure that require(s) end-to-end (e2e) confidentiality protection is/are encrypted (e.g., using JWE);

B) E2E Integrity Protection (ipBlock): The part(s) of the intermediate data structure that require(s) e2e protection from modification by the intermediaries is/are signed (e.g., using JWS); and C) Integrity Protection with Modification Tracking (mipBlock): A modification structure such as one or more arrays comprising the selective modifications by the intermediaries to the data of the integrity protected part (ipBlock). This data structure is integrity protected in an example embodiment.

The integrity protection with modification tracking is configured to store in the modification structure one or more modifications together with a signature of a respective entity such as the sSEPP 430-1 or an intermediate node 440 (e.g., for all modifications in common or separately for each modification). The modification structure comprises a modification chain which in some embodiments has one entry per intermediary. In some embodiments, each modification chain entry is integrity protected with the signature of the intermediary that has performed the modification. This way, the rSEPP 430-2 can subsequently determine separately for each change whether it was performed by an authorized intermediary 440 and whether it complies with the modification policy for that intermediary.

In some embodiments, the original modification structure is dynamic such that each intermediate node 440 adds a new field to a modified item so forming a growing array.

Data re-arrangement will now be described with respect to FIG. 7, which shows an example request message flow 700 for a request message transmitted from AMF 420 to AUSF 450 in the system 400, where the original HTTP request message (e.g., the first message) is transformed (e.g., to the second message) as it traverses in this example from the AMF 420 in the operator network via sSEPP 430-1 at the edge and over a roaming interface through one IPX provider 440 that modifies a given information element (e.g., IE4 in this example) in the message. The rSEPP 430-2 verifies the received (second) message, and reassembles the HTTP request message with the modified IE4 (to the third message, which may be the same or different by content than the second message depending on whether all modifications were acceptable), before forwarding the third message to the AUSF 450. Again, it should be appreciated that the particular NFs (e.g., AMF 420 and AUSF 450) are used by way of example only, and that embodiments are not limited solely to use in exchanging requests and responses between an AMF and an AUSF.

In block 710, the sSEPP 430-1 receives an initial message (e.g., the first message) from the AMF 420. In the first message, HTTP Header 1 and IE2 need e2e encryption, IE4 is a modifiable attribute, and the remaining portions need e2e integrity protection.

In block 720, the sSEPP 430-1 forms the second message which includes parts or blocks as indicated above: an encBlock that is an array of JSON objects that require e2e encryption; an ipBlock JSON object that is integrity protected; and an mipBlock that contains a modification structure such as one or more arrays for patch updates. In some embodiments, first values (e.g., with zero changes) may be recorded in the arrays by the sSEPP 430-1. Attributes in the HTTP headers and payload that require encryption are moved to the encBlock. Values of these attributes in the ipBlock are replaced by references pointing to the appropriate entry in the encBlock. The initial content of the mipBlock is empty, representing an unmodified ipBlock. In some embodiments, such as those which use non-delta coding, the initial content of the mipBlock may contain zero changes or the modifiable values.

In block 730, intermediate node 440-1 (IPX1) updates one or more features or sub-features of IE4. To this end, the IPX1 creates patch_IPX1 for its update and appends patch_IPX1 to the modification structure (e.g., the Mod_chain array).

In block 740, the rSEPP 430-2 re-assembles the message and sends the re-assembled (third) message to the AUSF 450. At this stage, the rSEPP 430-2 verifies the integrity of the ipBlock, decrypts the contents in the encBlock, and places the decrypted values back into the ipBlock. Further, the rSEPP 430-2 verifies the update from IPX1 (e.g., patch_IPX1) and updates the original value in the ipBlock. The complete (third) message is re-assembled from the updated ipBlock, and the third message is forwarded to the target NF (e.g., AUSF 450).

In some embodiments, the rSEPP 430-2 further determines which of the modifications in the modification structure (e.g., Mod_chain in the FIG. 7 example) are acceptable. The features and sub-features in the ipBlock are modified only by modifications determined to be acceptable. In other words, the rSEPP 430-2 performs the construction of the third message using the modification structure to the extent that the modifications in the modification structure are determined to be acceptable.

In some embodiments, determining which of the modifications in the modification structure are acceptable comprises verifying the integrity of each modification. The integrity of each modification is verified, for example, by decrypting the modifications in a manner specific to an entity that has purportedly made the modification. The integrity of each modification is verified in some embodiments using an appended integrity protector, such as a cryptographic signature and/or a message authenticator. Determining which of the modifications in the modification structure are acceptable may further or alternatively include checking which of the modifications were permissible based on a modification policy for the maker(s) of the modification(s).

Figure 7:
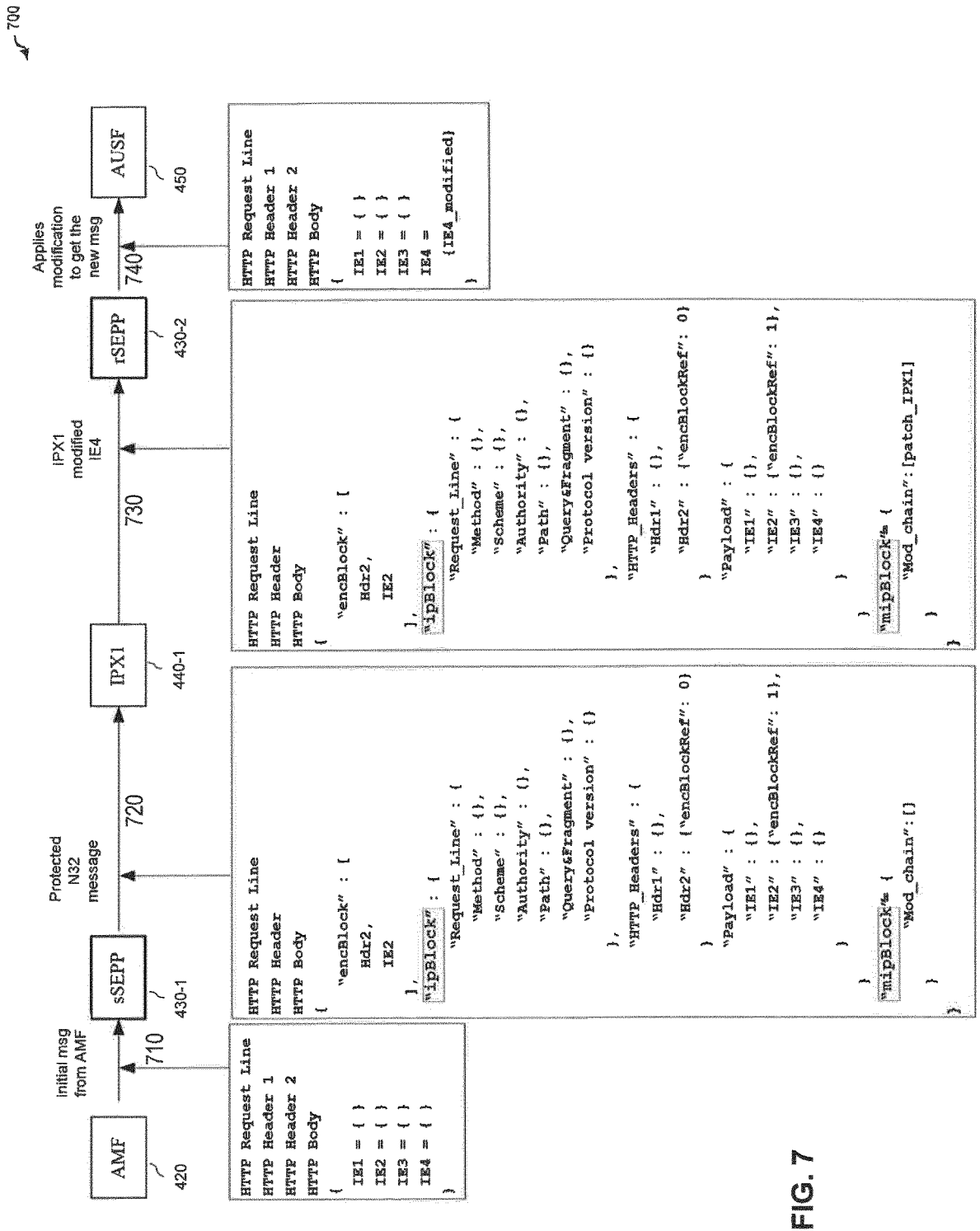
FIG. 7 illustrates a further example of a request message flow through the portion of the communication system in FIG. 4.

In FIG. 7, only one intermediate node 440-1 is shown for simplicity and clarity of illustration. In practice, there may be multiple intermediate nodes 440 (e.g., IPX1, IPX2, etc.) some of which make no modifications to the second message. In this case, an intermediate node 440 may either record zero changes in the modification structure or leave the modification structure untouched and simply forward the second message with no changes at all. It is also possible to mix these (where some intermediary nodes that make no changes record zero changes and forward modified versions of the second message while other intermediary nodes that make no changes simply forward the second message as received).

In the description above, certain assumptions are made regarding the SEPPs 430 and intermediate nodes 440. For example, it is assumed as a pre-requisite that the SEPPs 430 have authorized intermediaries that are directly under the operator's control through an agreement, and that the SEPPs 430 have obtained the required public key or an established shared symmetric key needed for signature verification, message authentication code (MAC) verification, etc. In some embodiments, each SEPP 430 authorizes its own IPX provider or other intermediary node or nodes, and shares the required public key or symmetric keys with other SEPPs 430. It is further assumed in some embodiments that each of the SEPPs 430 is aware of how each of the IEs is protected (e.g., e2e confidentiality protected, e2e integrity protected, e2e integrity protected but modifiable by authorized intermediaries, etc.). For the sSEPP 430-1, this may be defined by configuration of the sSEPP 430-1. The rSEPP 430-2 may learn the applied protection from the structure of the message, and may be configured with policies that define permitted modifications and authorized intermediaries.

When transforming a "first" message into the "second" message as described above, there may be certain parts or portions of a request URI for which different or selective protection should be applied. As an example, a request URI may include "path" and "query" parts which may be split to have selective protection applied to the "path" and/or "query" parts or portions thereof. Illustrative embodiments provide techniques for allowing and applying such selective protection when transforming the first message into the second message.

As described above, methods for protecting protocol messages on an inter-network interface may permit detection of unauthorized modifications. A general framework for selectively applying encryption, integrity protection and integrity protection with tracking of allowed modifications to parts of a message by transforming a first message to a second message are described above with respect to FIGS. 4-6. Message formats for flexible protection of protocol messages on the inter-network interface through splitting a structure payload into an integrity-protected part and an encrypted part when transforming the first message to the second message are described above with respect to FIG. 7. The techniques of FIG. 7 provide extensions for representing an original or first message in an integrity protection mode that allows selected, tracked modifications.

Illustrative embodiments provide further extensions to the framework and message format described above with respect to FIGS. 4-7 for mapping parts of a request URI (e.g., of an HTTP message) onto a JSON structure to selectively apply protection methods (e.g., encryption, integrity protection, integrity protection with modification tracking) to parameters of the request URI.

A URI is a string of characters used to identify a resource. A generic URI, as defined in RFC 3986, is of the form:

scheme:[//[userinfo@]host[:port]]path[?query][#fragment]

The "path" may consist of segments that are separated by "/". A segment is either a constant string or a variable that can be computed at runtime, or configured into the system at deployment time. A variable is replaced at runtime by one or multiple actual path segments. Typically, a path variable is denoted by a variable name enclosed in curly brackets. An example path format is shown below:

Example: /constant1/constant2/{variable}/constant3/

The "query" consists of name-value pairs, name and value separated by "=" and the pairs separated by "&". In some cases, the value and the "=" character may be omitted and the presence of the parameter name carries the information (e.g., flag semantics). An example query format is shown below:

Example: name1=value1&name2=value2&name3

Structured representations of the path and query components used in some embodiments will now be described.

For the structured representation of the path component, the path of the URI is split into "parts" (substrings) which are represented as an array of structured objects, such as a JSON array. The path URI component is part of the "first message" and "third message" described above, while the array of structured objects is part of the "second message" described above.

Each path part in the array has the following structure, which can be represented as a JSON object:
{
"value": <string> (string that represents one or more path segments in the URI, required),
"name": <string> (string that represents a variable name, conditional, present for URI variables if the intent is to reveal the variable structure, and absent for URI constants)
}
For example, a URI structure may have a path of:
"/{prefix}/{apiVersion}/clients/{supi}"
and an actual path URI of:
"/production/my-api/v1/clients/123"
For this example path URI, the JSON structure may be:
[
{"value": "/"},
{"value": "production/my-api", "name": "prefix"},
{"value": "/"},
{"value": "v1", "name": "apiVersion"},
{"value": "/clients/"},
{"value": "123", "name": "supi"},
]
This JSON structure array may be stored in the ipBlock described above.

In some embodiments, it is desired to not reveal the structure of parts of the URI, even if it contains multiple variables. In such cases, the "name" may be omitted as well and the example URI structure may be:
"/{prefix}/{apiVersion}/clients/{supi}/{partnerId}"
and the actual URI may be:
"/production/my-api/v1/clients/444/p123"
For this example, various mapping rules may be used, such as: (i) that it will not be revealed that the structure {prefix}/{apiVersion} is based on variables; (ii) that the {supi} value will be encrypted; and that, for {partnerId}, the parameter name and value will be revealed. Given these rules, the above JSON structure array may be modified as follows:
[
{"value": "/production/my-api/v1/clients/"},
{"value": {"N32ref": "1"}, "name": "supi"},
{"value": "p123", "name": "partnerId"},
]
To selectively encrypt parts of the URI path, a part of the path component (e.g., an entry in the relevant JSON structure or portion thereof) may be replaced by a reference to or an index of an entry in the encBlock, as illustrated above for the URI path variable "supi".

For the structured representation of the query URI component, the query of the URI is parsed into a sequence of <name>/<value> entities similar to the structured representation of parts in the path URI component. In contrast to the path URI component, the name is required for the query URI component and it is possible to omit the value.

More precisely, the query component of the URI may be split into "parts" (substrings) which are represented as an array of structured objects, such as a JSON array. The query URI component is part of the first message and the third message, while the array of structured objects is part of the second message.

Each query part in the array has the following structure, which can be represented as a JSON object:
{
"value": <string> (string that represents the value of a URI query parameter, provided if the value was given),
"name": <string> (string that represents a query parameter name, required)
}
For example, a URI structure may have a query with two parameters that have a value and one that is a flag:
"name=alice&supi=123&flag"
For this example query URI, the JSON structure may be:
[
{"name": "name", "value": "alice"},
{"name": "supi", "value": "123"},
{"name": "flag"}
]
The JSON structure array may be stored in the ipBlock described above.

To selectively encrypt certain URI query parameters, an entry may be replaced by a reference into the encBlock. In the case of URI query parameters, the "value" part or the complete structure representing a URI query parameter can be replaced by a reference to the encrypted part, as even the presence of a parameter may reveal information.

Continuing with the above example query URI, assume that it is desired to protect both the value of "supi" and the information that the flag is present. Given these rules, the JSON structure may be modified and replaced with the following:
[
{"name": "name", "value": "alice"},
{"name": "supi", "value": {"N32Ref": 1}},
{"N32Ref": 2}
]

The "<name>=<value>&" syntax of queries is defined in the HTML specification for the X-www-form-urlencoded format (https://url.spec.whatwg.org/#application/x-www-form-urlencoded), not in the URI syntax specification RFC 3986. Thus, RFC 3986 allows cases where the query part is formatted differently, following URI syntax but not HTML syntax. In such cases, the structure of the query part may be considered "opaque" or not conforming to the "<name>=<value>&" syntax assumed above. To handle such cases embodiments provide functionality for handling opaque query parts in the data format mapping.

To do so, some embodiments define query_opaque for so-called opaque query parts as a single string, and define query_structured for query parts following the "<name>=<value>&" syntax as the structured array described above. In some cases, only one of these may be present in a given URI. In other cases, a combination of both may together represent the query part of a given URI. The use case for using only query_opaque would be to represent an arbitrarily-structured query, and allow for encrypting the query part as a whole. The use case for using only query_structured would be to represent a query that is structured according to the HTML specification (e.g., using the "<name>=<value>&" syntax), and to allow selective application of different protection methods (e.g., encryption, integrity protection, integrity protection with modification tracking) to the different query parts. The use case for using both would be to protect a part of a structured query as a whole using query_opaque while allowing selective application of different protection methods (e.g., encryption, integrity protection, integrity protection with modification tracking) to the query parts in query_structured.

FIG. 8 shows an example of a "second message" 820 that is a transformation of a "first message" from a NF (e.g., AMF 420) received at a sending SEPP (e.g., sSEPP 430-1). The second message 820 includes a JSON representation of an example HTTP message with structured representation of request URI components. As shown, the encBlock includes at the first position (index "0") the value of "supi" along with additional values for HTTP Header 2 ("Hdr2") and information element IE2 in second and third positions (indexes "1" and "2, respectively). The ipBlock includes the "path" of the request URI having the entry for the value of supi replaced with a reference to the entry 0 of the encBlock. The ipBlock further includes both query_opaque and query_structured parts for the "query" of the request URI as described above. As further shown, the ipBlock includes the entry for the HTTP Header 2 value replaced with reference to entry 1 of the encBlock, and the entry for the payload value for IE2 replaced with reference to entry 2 of the encBlock.

Figure 9:
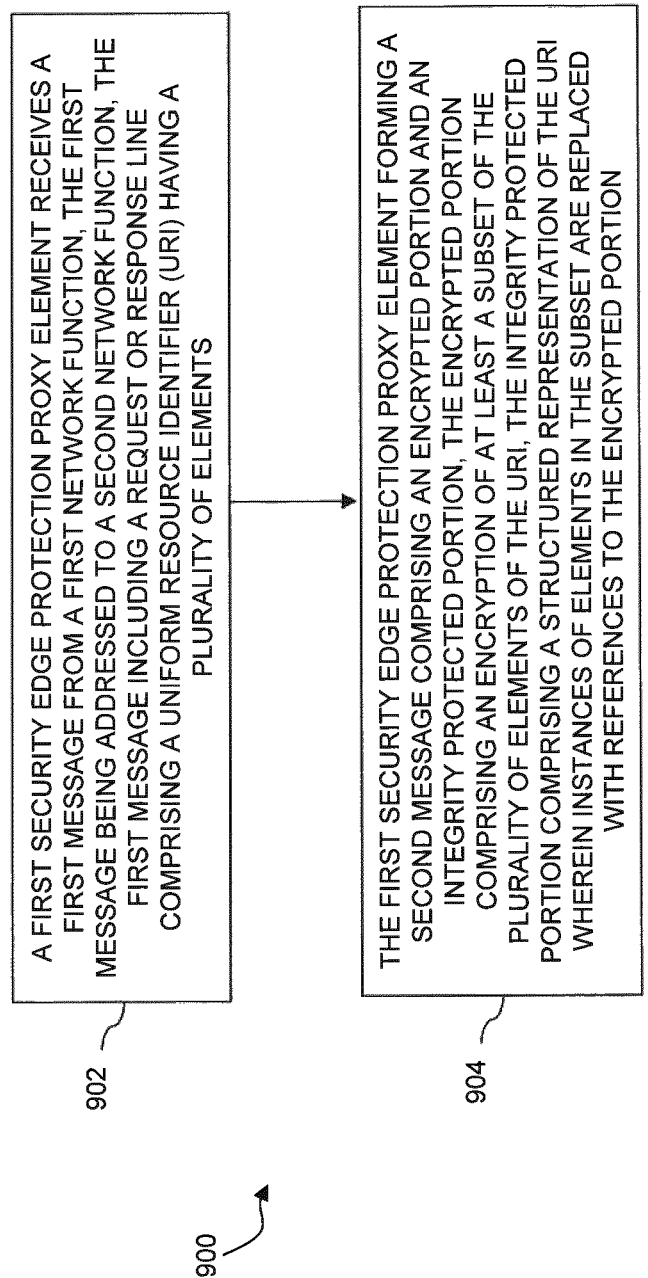
FIG. 9 illustrates a methodology for network function messaging according to an illustrative embodiment.

FIG. 9 shows a methodology 900 for network function messaging. The methodology 900 may be performed by a first security edge protection proxy element (e.g., sSEPP 430-1) in a communication system (e.g., 400) comprising a first network (e.g., PLMN 410-1) operatively coupled to a second network (e.g., PLMN 410-2), where the first security edge protection proxy element is operatively coupled to a second security edge protection proxy element (e.g., rSEPP 430-2) in the second network.

In step 902, the first security edge protection proxy element receives a first message from a first network function (e.g., AMF 420) in the first network, with the first message being addressed to a second network function (e.g, AUSF 450) in the second network. The first message comprises one of a request line and a response line (e.g., an HTTP Request or Response line) that includes a URI having a plurality of elements.

In step 904, the first security edge protection proxy element forms a second message that includes an encrypted portion and an integrity protected portion. The encrypted portion comprises an encryption of at least a subset of the plurality of elements of the URI (e.g., parts of a "path" or "query" component of the URI). The integrity protected portion comprises a structure representation of the URI (e.g., in JSON) where instances of the elements in the subset (e.g., those elements that are to be e2e protected) are replaced with references or pointers to the encrypted portion (e.g., using the indexes of the respective entries in the encrypted portion).

In some embodiments, the second message formed in step 904 may further include a modification structure for subsequent modifications of the second message by one or more intermediate nodes (e.g., 440) disposed between the first security edge protection proxy element in the first network and a second security edge protection proxy element in the second network.

The first message received in step 902 may further comprise one or more headers (e.g., HTTP Headers) and an optional payload comprising one or more IEs. The encrypted portion of the second message formed in step 904 may include one or more of the headers and/or one or more of the IEs, and the integrity protected portion of the second message formed in step 904 may replace instances of those headers and/or IEs with references to the entries in the encrypted portion of the second message. The first message may be an HTTP request or response.

It should again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:

1. An apparatus comprising:
at least one processor coupled to a memory and configured to implement a first security edge protection proxy element of a first network in a communication system, the first security edge protection proxy element being operatively coupled to a second security edge protection proxy element of a second network coupled to the first network;
the first security edge protection proxy element being configured:
to receive a first message from a first network function in the first network, the first message being addressed to a second network function in the second network, the first message comprising one of a request line and a response line comprising a uniform resource identifier (URI) having a plurality of elements; and
to form a second message comprising an encrypted portion and an integrity protected portion, the encrypted portion comprising an encryption of at least a subset of the plurality of elements of the URI, the integrity protected portion comprising a structured representation of the URI, wherein the elements in the subset within the structured representation are replaced with references pointing to the encrypted portion.

2. The apparatus of claim 1, wherein the first message comprises one of a hypertext transfer protocol (HTTP) request and an HTTP response.

3. The apparatus of claim 1, wherein the structured representation in the second message of the URI in the first message comprises a JavaScript Object Notation (JSON) structure.

4. The apparatus of claim 1, wherein the URI comprises a path component and the structured representation of the URI comprises an array of structured objects comprising substrings of the path component.

5. The apparatus of claim 4, wherein the structured objects of the array comprise one or more first strings representing one or more path segments in the URI and one or more second strings representing variable names each related to one or more of the path segments represented in one of the first strings.

6. The apparatus of claim 5, wherein the structured representation of the URI in the integrity protected portion of the second message omits at least a given one of the second strings to hide a URI variable.

7. The apparatus of claim 5, wherein the structured representation of the URI in the integrity protected portion of the second message replaces at least a given one of the first strings with a reference to an entry in the encrypted portion of the second message containing the given first string.

8. The apparatus of claim 1, wherein the URI comprises a query component and the structured representation of the URI comprises an array of structured objects comprising substrings of the query component.

9. The apparatus of claim 8, wherein the structured objects of the array comprise one or more pairs of strings, each pair of strings comprising a first string representing a query parameter name and a second string representing a query parameter value.

10. The apparatus of claim 9, wherein the structured representation of the URI in the integrity protected portion of the second message replaces at least a given one of the second strings with a reference to an entry in the encrypted portion of the second message containing the given second string.

11. The apparatus of claim 9, wherein the structured representation of the URI in the integrity protected portion of the second message replaces at least a given one of the pairs of strings with a reference to an entry in the encrypted portion of the second message containing the given pair of strings.

12. The apparatus of claim 8, wherein the structured objects of the array comprise one or more strings each representing a query parameter name for which there is no associated query parameter value.

13. The apparatus of claim 12, wherein the structured representation of the URI in the integrity protected portion of the second message replaces at least a given one of the strings with a reference to an entry in the encrypted portion of the second message containing the given string.

14. The apparatus of claim 1, wherein the URI comprises an opaque query component, and the structured representation of the URI in the integrity protected portion of the second message replaces the opaque query component with a reference to an entry in the encrypted portion of the second message containing the opaque query component.

15. The apparatus of claim 1, wherein the URI comprises a query component, and the structured representation of the URI in the integrity protected portion of the second message:
  replaces an opaque part of the query component with a first reference to a first entry in the encrypted portion of the second message containing the opaque part of the query component; and
  replaces at least a given substring of the query component with at least a second reference to at least a second entry in the encrypted portion of the second message containing the given sub string, the given sub string comprising one of: a given pair of strings comprising a first string representing a query parameter name and a second string representing a query parameter value; the second string of the given pair of strings; and a given flag string representing a query parameter name for which there is no associated query parameter value.

16. A method comprising:
  in a communication system comprising a first network operatively coupled to a second network wherein a first security edge protection proxy element of the first network is operatively coupled to a second security edge protection proxy element of the second network;
  receiving, at the first security edge protection proxy element, a first message from a first network function in the first network, the first message being addressed to a second network function in the second network, the first message comprising one of a request line and a response line comprising a uniform resource identifier (URI) having a plurality of elements; and
  forming, at the first security edge protection proxy element, a second message comprising an encrypted portion and an integrity protected portion, the encrypted portion comprising an encryption of at least a subset of the plurality of elements of the URI, the integrity protected portion comprising a structured representation of the URI, wherein the elements in the subset within the structured representation are replaced with references pointing to the encrypted portion.

17. The method of claim 16, wherein the URI comprises a path component and the structured representation of the URI comprises an array of structured objects comprising substrings of the path component.

18. The method of claim 16, wherein the URI comprises a query component and the structured representation of the URI comprises an array of structured objects comprising substrings of the query component.

19. An article of manufacture comprising a non-transitory computer-readable storage medium having embodied therein executable program code that when executed by a processor causes the processor to perform the steps of:
  in a communication system comprising a first network operatively coupled to a second network wherein a first security edge protection proxy element of the first network is operatively coupled to a second security edge protection proxy element of the second network;
  receiving, at the first security edge protection proxy element, a first message from a first network function in the first network, the first message being addressed to a second network function in the second network, the first message comprising one of a request line and a response line comprising a uniform resource identifier (URI) having a plurality of elements; and
  forming, at the first security edge protection proxy element, a second message comprising an encrypted portion and an integrity protected portion, the encrypted portion comprising an encryption of at least a subset of the plurality of elements of the URI, the integrity protected portion comprising a structured representation of the URI, wherein the elements in the subset within the structured representation are replaced with references pointing to the encrypted portion.

* * * * *